United States Patent [19]
Wakabayashi et al.

[11] Patent Number: 4,937,450
[45] Date of Patent: Jun. 26, 1990

[54] INFRARED DETECTOR COMPRISING AN EVACUATED AND COOLED DEWAR HAVING AN ELLIPTICAL SPHEROID END WINDOW

[75] Inventors: Satoshi Wakabayashi; Tohru Nonoyama; Toru Tajime, all of Kamakura, Japan

[73] Assignee: Mitsubishi Denki Kabushiki Kaisha, Tokyo, Japan

[21] Appl. No.: 160,430

[22] Filed: Feb. 25, 1988

[30] Foreign Application Priority Data

Feb. 25, 1987 [JP] Japan ..................... 62-41656
Feb. 25, 1987 [JP] Japan ..................... 62-41657

[51] Int. Cl.$^5$ .................. G01J 1/00; G02B 27/00; G02B 5/00; G02B 7/00
[52] U.S. Cl. .................................. 250/352; 250/353; 350/276 R; 350/319; 350/630
[58] Field of Search ................ 250/352, 353; 350/1.1, 350/276 R, 319, 630

[56] References Cited

U.S. PATENT DOCUMENTS 3,006,157 10/1961 Haettinger et al. ............... 250/352
3,368,078 2/1968 Flint et al. ......................... 250/353
3,942,010 3/1976 Peterson et al. .................. 250/352
4,178,775 12/1979 Smetana ........................... 250/352
4,194,119 3/1980 MacKenzie ...................... 250/352
4,420,688 12/1983 LeBars .............................. 250/352
4,421,985 12/1983 Billingsley et al. ............... 250/353
4,507,551 3/1985 Howard et al. .................. 250/352
4,761,556 8/1988 Simpson et al. .................. 250/352

FOREIGN PATENT DOCUMENTS 2115143 9/1983 United Kingdom ............. 250/353

OTHER PUBLICATIONS

Optical Design for the Infrared, by Robert E. Fischer, SPIE vol. 531 Geometrical Optics (1985) pp. 82–120.

Primary Examiner—Constantine Hannaher
Assistant Examiner—J. Eisenberg
Attorney, Agent, or Firm—Sughrue, Mion, Zinn, Macpeak and Seas

[57] ABSTRACT

The evacuated and cooled Dewar 1 of an infrared detector has a window end in the shape of an elliptical spheroid, and an IR detection element 3 is mounted within the focal circle of the spheroid. The construction minimizes the sensing of spurious IR rays by the detection element, as well as the heat load for the coolant and the cool down time.

7 Claims, 1 Drawing Sheet

INFRARED DETECTOR COMPRISING AN EVACUATED AND COOLED DEWAR HAVING AN ELLIPTICAL SPHEROID END WINDOW

BACKGROUND OF THE INVENTION

1. Field of the Invention

This invention relates to an infrared detector suitable for, for example, an infrared imaging device.

2. Description of the Prior Art

Photon-type (quantum-type) infrared detectors in the form of BLIPs (Background Limited Photodetector) usually include a cold shield to suppress noise. BLIPs are detectors in which noise due to fluctuations in the amount of excess electrons and positive holes generated by incident infrared rays and due to fluctuations in the recombination of both the excess electrons and positive holes is dominant, and such noise can be suppressed by reducing the amount of incident infrared rays.

The incident infrared rays can be divided into signal light radiated from an object and unwanted light other than the signal light. A shielding wall for interrupting this unwanted light is termed the cold shield. In the case of visible light, it is possible to interrupt the unwanted light by using a black shielding wall. However, in the infrared region, since an object at an ordinary temperature per se radiates infrared rays, it is necessary to devise a particular measure to suppress radiation by the shielding wall per se. One such measure is to cool the shielding wall to a low temperature. As may be seen from Planck's formula representing the radiant quantity W of a blackbody:

$$W = \sigma T^4,$$

where, $\sigma$ is the Stefan-Boltzmann constant, and T is the blackbody temperature,
the radiant quantity W can be substantially reduced by lowering the temperature. Since such a shielding wall is used by cooling to a low temperature, it is called a cold shield.

On the other hand, photon-type infrared detectors themselves are cooled in order to suppress noise due to electrons and positive holes generated by thermal excitation. For example, InSb detectors and HgCdTe detectors are cooled to the temperature of liquid nitrogen (77K) or liquid argon (80K). Since the cold shield is mounted surrounding the detector, it is usually cooled by the same means used to cool the detector.

FIG. 1 is a sectional view of a prior art infrared detector as shown on page 354 of "Infrared System Engineering", by R. D. Hudson, Jr., issued by John Wiley & Sons, 1969, wherein a container 1 having double walls is referred to hereinafter as a Dewar. Reference numeral 2 designates a Dewar window, 3 is a photon-type infrared detection element, 4 is a cold shield, 5 is a cold filter, 6 is a space for accommodating a container filled with a coolant, 7 are infrared rays to be measured, 8, 9 are unwanted or spurious infrared rays (other than the infrared rays 7 to be measured), and 12 designates a mounting substrate for the detection element 3. A container in the space 6 is filled with coolant to cool the detection element 3 and to increase the detection sensitivity. The cold filter 5 is secured to the cold shield 4, and since the cold shield is adhered to a wall portion of the container 6, the cold shield 4 and cold filter 5 are cooled together. In order to cool the detection element 3, cold shield 4, and cold filter 5 efficiently, the space enclosed by the Dewar 1 and Dewar window 2 is evacuated.

In this prior art detector the infrared rays 7 to be measured impinge on the detection element 3 after passing through the Dewar window 2, an opening 4a of the cold shield 4, and cold filter 5, and are detected. The cold shield 4 mounts the cold filter 5, and at the same time prevents unnecessary infrared rays radiated from the surrounding background at an ordinary temperature from impinging on the detection element 3 to thereby reduce the noise generated by the detection element. Although the cold shield 4 generates some emissions from its surface, since it is cooled to a low temperature the amount of unwanted infrared rays radiated from the surface of the cold shield is reduced to such an extent that it can be neglected as compared with the infrared rays 7 to be measured. The cold filter 5 transmits a desired range of wavelengths of the infrared rays 7 to be measured which impinge on the detection element 3 through the opening 4a of the cold shield 4, and suppresses the transmission of infrared rays in an undesired wavelength range to further reduce the noise. For this purpose, the cold filter 5 is formed by depositing on the surface of a substrate a coating or layer of dielectric material which selectively transmits the desired wavelength range of the infrared rays, and in which the substrate absorbs only a low degree of infrared rays in the desired wavelength range. In addition, as described above, the cold filter 5 is cooled to a low temperature in order to suppress the amount of unwanted infrared rays radiated from the cold filter per se. Since the cold filter with its deposited dielectric material has a high reflectivity for the unwanted wavelength range of the infrared rays, such rays as indicated at 8 in FIG. 1 radiated from the cold shield 4, the mounting substrate 12, and the detection element 3 are reflected by the cold filter and then impinge on the detection element. However, since the cold shield 4, mounting substrate 12, and infrared detection element 3 are cooled to a low temperature, the radiant quantity of unwanted infrared rays is negligibly small. Accordingly, detector noise due to infrared rays emitted by such elements can be neglected.

By omitting the cold filter 5, and instead forming a filter of dielectric material on the Dewar window 2, it is possible to eliminate infrared rays other than the wavelength range of the rays 7 to be measured from entering from the outside of the Dewar 1. However, with such an arrangement unwanted rays 9 radiated from the inner surface of the outer cylinder of the Dewar are reflected from the dielectric filter formed on the window 2 and impinge on the detection element 3 to cause noise. Since the outer cylinder of the Dewar is not cooled by direct contact with the coolant container space 6, this noise becomes unacceptably large.

In the prior art infrared detector mentioned above, it has been necessary to cool the detection element, the cold shield, and the cold filter in order to reduce noise.

Recently, multiple-element infrared detectors have been widely used, and the size of the cold shields used therein has become large. Thus, the heat load imposed on the cooling means has increased. As a result, a problem has arisen in that the time (cool down time) for the detection element to be cooled to a predetermined temperature has increased. Moreover, when a refrigerator such as a Stirling cycle cooler or the like is used, the power consumption of a motor and its size are increased.

Furthermore, when the size of the cold shield is increased, the manner of attaching the cold shield becomes a problem. In order to prevent the degradation of its vibration-resistance, it is necessary to mount the cold shield securely. However, it is difficult to achieve this without increasing the heat load.

SUMMARY OF THE INVENTION

This invention solves the above problems by providing an infrared detector which reduces the time required for cooling to a predetermined temperature by reducing the coolant heat load to a great extent while maintaining a noise reduction level similar to the prior art.

In an infrared detector of the invention, the cold filter is omitted to reduce the heat load for the coolant, and the Dewar window is shaped as a spheroid obtained by rotating an ellipse about its minor axis. A filter which does not transmit an unwanted wavelength range is formed by depositing a dielectric material on the spheroid portion, or a portion of the Dewar window except for an opening through which infrared rays to be measured pass is formed with an infrared reflecting member. Accordingly, only the required wavelength range of infrared rays coming from the outside are permitted by the filter to impinge on the detection element, or infrared rays except those coming through the opening of the Dewar window are reflected and do not impinge on the detection element. Infrared rays radiated from the inner surface of the Dewar outside of the focuses of the ellipse are reflected by the spheroid-shaped surface away from the infrared detection element and thus do not impinge on it.

Any infrared rays impinging on the detection element after being reflected from the dielectric filter formed on the Dewar window or from the infrared reflecting member only constitute a minute amount of the infrared rays radiated from the detection element and structure in the vicinity thereof, and no infrared rays from other areas impinge on the detection element. As a result, there is no need to provide a cold filter, or in some cases even a cold shield. Therefore, the heat load is decreased and the time required for cooling is reduced to a great extent.

DETAILED DESCRIPTION OF THE PREFERRED EMBODIMENTS

Figure 1:
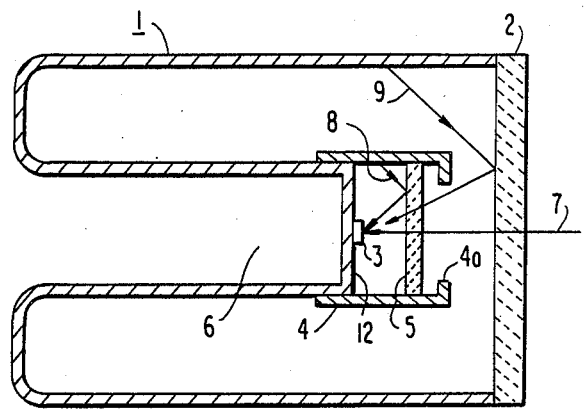
FIG. 1 is a sectional view showing an example of a prior art infrared detector.
Figure 2:
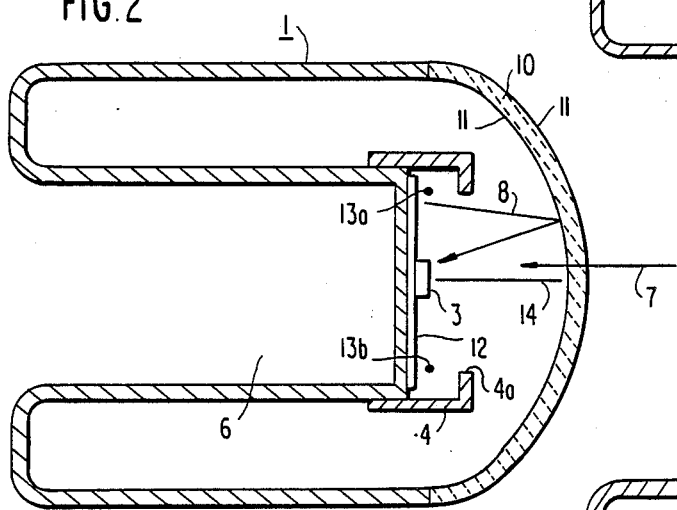
FIG. 2 is a sectional view of an infrared detector showing an embodiment of the invention.

Referring to FIG. 2 of the drawings, wherein the same reference numerals used in FIG. 1 represent identical or equivalent parts, reference numeral 10 designates a Dewar window of the invention, 11 is a dielectric filter formed on at least one of the inner and outer surfaces of the window 10 by depositing a layer of zinc sulfide (ZnS), lead fluoride (PbF), or the like in a vacuum, 13a and 13b are focuses of an ellipse, and 14 designates a minor axis of the ellipse.

The window 10 is formed in the shape of a spheroid (ellipsoidal surface of revolution) obtained by rotating the ellipse having focuses at 13a and 13b about the minor axis 14. The locus of the focuses 13a and 13b when the ellipse is rotated is a circle, referred to hereafter as a focal circle. The detection element 3 is positioned at the inside (in FIG. 2, at the central position) of the focal circle. The Dewar window 10 is disposed in an atmosphere at an ordinary or ambient temperature.

Externally generated infrared rays in the unwanted wavelength range are interrupted or blocked by the dielectric filter 11, to attendantly increase the noise suppression, which is further enhanced by the cold shield 4 whose opening 4a serves to narrow the range of vision or viewing angle of the detection element.

As to spurious or unwanted infrared rays radiated from the inside of the Dewar 1, since the window 10 is spheroid-shaped, those originating from inside the focal circle are reflected by the filter 11 back to the inside of the circle, and those originating from outside the focal circle are reflected by the filter back to the outside of the circle. Since the structure inside of the focal circle is cooled by a container in the space 6 simultaneously with the detection element 3, however, the quantity of radiation originating from inside the focal circle, that is, from the detection element 3 per se and the mounting substrate 12, is sufficiently small to preclude any significant increase in noise.

When a high reflectivity element such as an electrode or the like is provided on the mounting substrate 12 in the vicinity of the detection element 3, there is a possibility that unwanted infrared rays radiated from structures at ambient temperature and located inside and outside of the Dewar 1 impinge on the high reflectivity element due to multiple reflections within the Dewar, and are reflected therefrom and by the dielectric filter 11 to impinge on the detection element 3. As a countermeasure to this, such high reflectivity elements may be coated with an insulating infrared absorbing layer such as paint, etc.

In this respect, since the Dewar window 10 and the dielectric filter 11 are at ambient temperature, they radiate a larger quantity of unwanted infrared rays as compared with the prior art cold filter 5. However, since the window 10 and the filter 11 are formed from materials having a low absorptance, and moreover since the value of the emissivity is equal to the value of the absorptance, the emissivity of unwanted rays by these materials is small. Accordingly, even when the window 10 and filter 11 are at ambient temperature, their radiant quantity is small and the noise caused thereby is also small.

Figure 3:
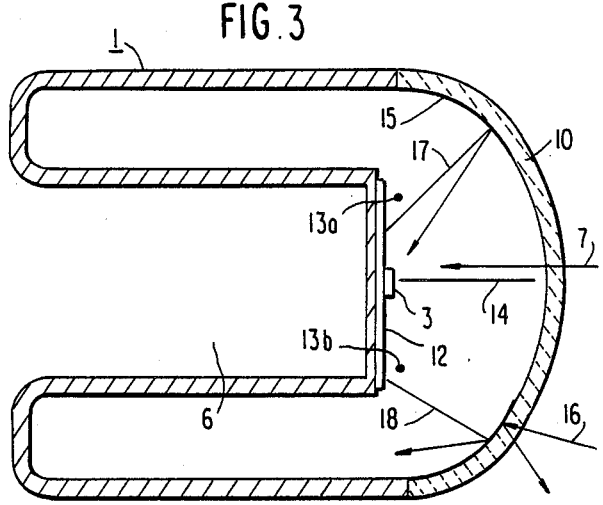
FIG. 3 is a sectional view of an infrared detector showing another embodiment of the invention.

FIG. 3 shows another embodiment of the invention in which the Dewar window 10 per se is formed in the shape of a spheroid as in FIG. 2, but instead of providing a dielectric filter 11, the inner surface of the window is coated with an infrared reflecting layer 15, for example, Al, Au, or the like, leaving a central opening (unnumbered) through the window 10 for the infrared rays 7 to be measured.

With such a detector construction, unwanted infrared rays 16 radiated from the surrounding background of the Dewar 1 are interrupted by the infrared reflecting layer 15, and cause no noise, which also enables the elimination of the cold shield 4.

Unwanted infrared rays 17 radiated from inside the Dewar are reflected as with the FIG. 2 embodiment due to the spheroid shape of the reflecting layer 15, i.e. rays 17 originating from inside the focal circle are reflected back inside the circle, and vice versa for rays 18 originating outside the circle, but since the elements inside the circle are cooled their radiation quantity is negligible. Moreover, since the emissivity of the infrared reflecting layer 15 is small, the unwanted radiation therefrom does not noticeably increase the noise level.

Figure 4:
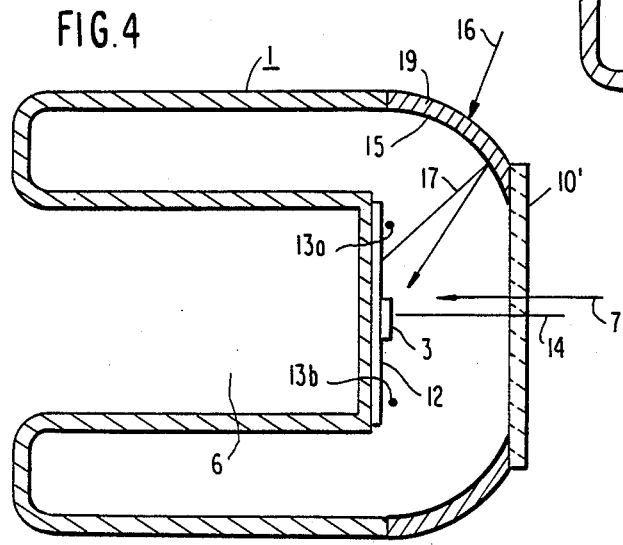
FIG. 4 is a sectional view of an infrared detector showing still another embodiment of the invention.

FIG. 4 shows still another embodiment of the invention, wherein reference numeral 19 designates an infrared shielding member having an inner surface formed in the shape of a spheroid by rotating an ellipse having focuses at 13a and 13b about a minor axis 14, and a planar window 10′ is sealingly secured to an opening molded in or ground out of the front face of the shielding member. The inner surface of the shielding member 19 is coated with an infrared reflecting layer 15. The rejection of unwanted internal infrared rays by the reflecting layer 15 is similar to that of the infrared reflecting member 15 shown in FIG. 3. Unwanted external infrared rays 16 are rejected by the infrared shielding member.

Referring again to the embodiment shown in FIG. 3, although the inner surface of the Dewar window 10 is coated with the infrared reflecting layer 15, a similar operation is achieved when the outer surface of the window is so coated instead. In this case, however, since the unwanted infrared rays radiated from the coated portion of the Dewar window constitute an additional noise source, the noise level is increased by a corresponding amount. Since the emissivity of the window 10 is small, however, the amount of noise increase is small and as a practical matter creates no problem.

Although the embodiments shown in FIGS. 2, 3 and 4 use only one detection element 3, the invention is not so limited and a similar effect can be achieved by mounting a plurality of detection elements on the substrate 12.

What is claimed is:

1. In an infrared detector comprising a Dewar (1) having the inside thereof evacuated, a Dewar window (10) defining a part of said Dewar and having an opening portion for passing infrared rays (7) to be measured, an infrared detection element (3) disposed within said Dewar for detecting infrared rays incident thereon through said opening portion, and cooling means (6) for cooling said infrared detection element and adjacent mounting structure (12), the improvements in which:
    (b) said Dewar window is formed in the shape of an ellipsoid obtained by rotating an ellipse about a minor axis (14) thereof, and
    (b) said infrared detection element is positioned entirely within a focal circle represented by the locus of two focuses (13a, 13b) of said ellipse when said ellipse is rotated about said minor axis, wherein
    (c) infrared rays radiated from the inside of the Dewar within the focal circle are reflected by the Dewar window back to the inside of the focal circle, and infrared rays radiated from the inside of the Dewar outside of the focal circle are reflected by the Dewar window back to the outside of the focal circle.

2. An infrared detector according to claim 1, further comprising a dielectric filter layer (11) for selectively transmitting a desired wavelength range of infrared rays coated on at least one of an inner surface and an outer surface of said Dewar window.

3. An infrared detector according to claim 1, further comprising an infrared reflecting layer (15) coated on said ellipsoid except at the opening portion of said Dewar window such that infrared rays originating outside of said Dewar and infrared rays originating inside of said Dewar are reflected by said infrared reflecting layer.

4. An infrared detector according to claim 2, wherein the Dewar window is substantially planar (10′), and a surrounding ellipsoid portion comprises an infrared reflecting member (19).

5. An infrared detector according to claims 1, 2, 3 or 4, wherein said Dewar is generally cylindrical and has a U-shaped, double walled cross-section, and said window defines a bottom portion of said U-shape.

6. An infrared detector, comprising:
    a Dewar window (10′) defining a part of said Dewar for passing therethrough infrared rays (7) to be measured;
    an infrared detection element (3) disposed within said Dewar for detecting infrared rays incident thereon through said window; and
    cooling means (6) for cooling said infrared detection element and adjacent mounting structure (12), wherein an inner surface portion (19) of said Dewar proximate and surrounding said window has an ellipsoid shape formed by rotating an ellipse about the minor axis (14) thereof, said inner surface portion being coated with a reflecting layer thereon and wherein said detection element is positioned entirely within a focal circle represented by the locus of two focuses (13a, 13b) of said ellipse when said ellipse is rotated about said minor axis, wherein infrared rays radiated from the inside of the Dewar within the focal circle are reflected by the inner surface portion of the Dewar back to the inside of the focal circle, and infrared rays radiated from the inside of the Dewar outside of the focal circle are reflected by said inner surface portion back to the outside of the focal circle.

7. An infrared detector according to claims 1 or 7, wherein said detection element is centered on said minor axis of the ellipse.

* * * * *

UNITED STATES PATENT AND TRADEMARK OFFICE
CERTIFICATE OF CORRECTION

PATENT NO. : 4,937,450

DATED : June 26, 1990

INVENTOR(S) : Satoshi Wakabayashi; Tohru Nonoyama; Toru Tajime

It is certified that error appears in the above-identified patent and that said Letters Patent is hereby corrected as shown below:

Column 5, line 50, "(b)" should read -- (a) --;

Column 6, line 20, "claim 2" should read -- claim 6 --;

Column 6, between lines 28-29, insert -- a Dewar (1) having the inside thereof evacuated; --;

Column 6, line 53, "claims 1 or 7" should read -- claims 1 or 6 --.

Signed and Sealed this

Fourteenth Day of January, 1992

Attest:

HARRY F. MANBECK, JR.

*Attesting Officer*     *Commissioner of Patents and Trademarks*